United States Patent [19]

Chaung

[11] Patent Number: 5,170,305
[45] Date of Patent: Dec. 8, 1992

[54] CONCEALED TYPE OF MAGNETIC TAPE CLEANER WITH FRICTION REDUCING MEANS

[76] Inventor: Mao-San Chaung, 7F No. 9, Lane 500, Min Chuan East Rd., Taipei, Taiwan

[21] Appl. No.: 729,543

[22] Filed: Jul. 15, 1991

[51] Int. Cl.$^5$ ............................................ G11B 23/50
[52] U.S. Cl. .................... 360/132; 360/128; 360/137
[58] Field of Search ................ 360/137, 128, 132, 133

[56] References Cited

U.S. PATENT DOCUMENTS

| | | | |
|---|---|---|---|
| 4,577,251 | 3/1986 | Okada | 360/128 |
| 4,722,016 | 1/1988 | Shirako et al. | 360/128 |
| 4,984,119 | 1/1991 | Backlund et al. | 360/128 |

Primary Examiner—David J. Severin
Attorney, Agent, or Firm—Jacobson, Price, Holman & Stern

[57] ABSTRACT

A magnetic tape cleaner comprising a back-glued pad of cleaning cotton, and a resilient fastener means to secure said back-glued pad of cleaning cotton to the casing of a video tape inside the protective cover thereof for cleaning the magnetic tape, wherein said resilient fastener means has a first unitary hooked member hooked in the infrared projecting hole in the casing of said video tape, a second unitary hooked member hooked in the gap defined in the casing of said video tape at the left side between the protective cover thereof, and a rectangular hole disposed in alignment with said infrared projecting hole for the passing therethrough of the infrared light from a video tape player. The cleaning pad is resiliently forced to move backwards by the magnetic tape of the video tape when the video tape is loaded in a video tape player to play, so that friction force between the magnetic tape and the cleaning pad is greatly reduced during cleaning operation.

1 Claim, 3 Drawing Sheets

CONCEALED TYPE OF MAGNETIC TAPE CLEANER WITH FRICTION REDUCING MEANS

BACKGROUND OF THE INVENTION

The present invention relates to magnetic tape cleaners and relates more particularly to a concealed type of magnetic tape cleaner with friction reducing means which is an improvement made on the prior art magnetic tape cleaner disclosed in Taiwanese Patent No. 80,201,314 which was also invented by the inventor of the present invention.

In Taiwanese Patent No. 80,201,314, there is disclosed a magnetic tape cleaner which, as shown in FIG. 1 is generally comprised of a resilient fastener means for securing a cleaning pad to the casing of a video tape inside the protective cover thereof to clean the tape when it is loaded in a tape player and driven to play. The resilient fastener means has a small round hole A at the center, a split B longitudinally extending downwards from said small round hole A to the bottom edge thereof, a partly damaged rectangular hole D bilaterally extending from said split B at a location between said small round hole A and said bottom edge, and two unitary hooks E projecting from said rectangular hole D at two opposite ends. The resilient material property of the resilient fastener means permits the cleaning pad to be resiliently forced to move backwards when the magnetic tape is stretched during its playing mode, so as to reduce the friction force against the magnetic tape while rubbing off the dirts from the magnetic tape. The present invention is to provide an improvement on the resilient fastener means permitting it to be more easily fastened in place to resiliently hold a cleaning pad to clean the magnetic tape of a video tape to which it is attached.

SUMMARY OF THE INVENTION

The magnetic tape cleaner of the present invention is generally comprised of a resilient fastener for attaching a cleaning pad to the casing of a video tape permitting said cleaning pad to be resiliently disposed in the route through which the magnetic tape of said video tape passes during its playing mode. The resilient fastener has a first unitary hooked member hooked in the infrared projecting hole in the casing of a video tape, a second unitary hooked member hooked in the gap defined in the casing of said video tape at the left side between the protective cover thereof, and a rectangular hole disposed in alignment with said infrared projecting hole for the passing therethrough of the infrared light from a video tape player. The cleaning pad is resiliently forced to move backwards by the magnetic tape of the video tape when the video tape is loaded in a video tape player to play, so that friction force between the magnetic tape and the cleaning pad is greatly reduced during cleaning operation and, the magnetic tape is cleaned before touching the magnetic head of said video tape player.

BRIEF DESCRIPTION OF THE DRAWINGS

The present invention will now be described by way of example only with reference to the annexed drawings, in which.

DETAILED DESCRIPTION OF THE PREFERRED EMBODIMENT

Figure 1:
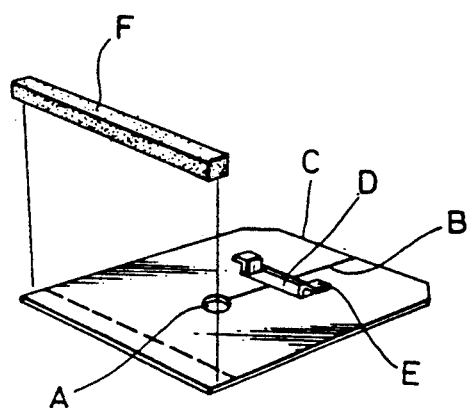
FIG. 1 is a dismantled perspective view of the prior art.
Figure 2:
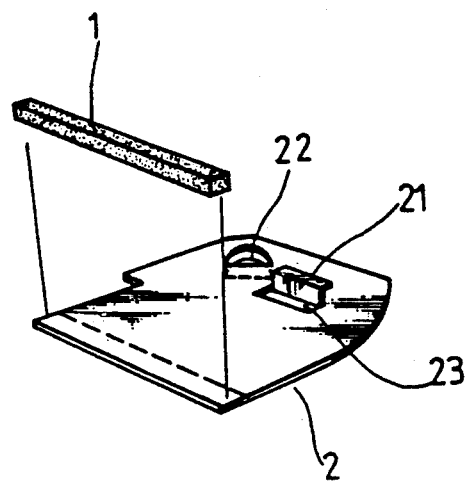
FIG. 2 is a perspective view of the preferred embodiment of the present invention.
Figure 3:
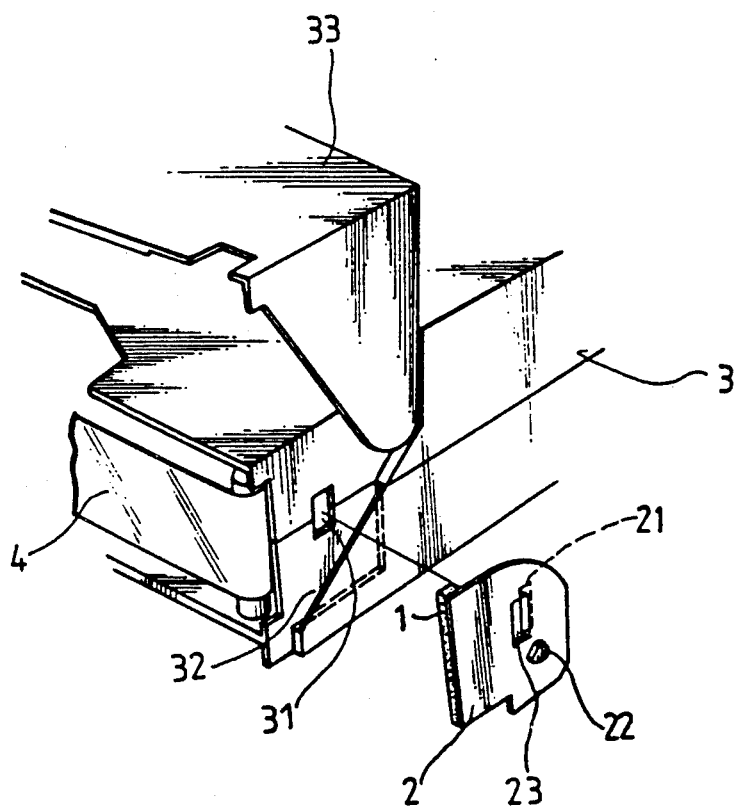
FIG. 3 illustrates that a magnetic tape cleaner of the present invention has been fastened in a video tape's casing at the inside.

Referring to FIGS. 2 and 3, therein illustrated is the preferred embodiment of the magnetic tape cleaner of the present invention which is generally comprised of a cleaning pad 1 which is made of cleaning cotton and back-glued, and a resilient fastener 2. Similar to the magnetic tape cleaner of the Taiwanese Patent No. 80,201,314, the resilient fastener 2 is to be attached to the casing of a video tape adjacent to the infrared projecting hole therein. The main feature of the present invention is that the resilient fastener 2 is made of a spring plate having two unitary, hooked members 21 and 22 projecting therefrom at one side and a rectangular hole 23 at a suitable location, wherein the hooked member 21 is disposed near the center area, having a hooked terminal end turning inwards backwards for hooking in the infrared projecting hole 31 on a video tape directly permitting said rectangular hole 23 to be disposed in alignment with said infrared projection hole 31; the other hooked member 22 is spaced from the hooked member 21 and has a hooked terminal end turning outwards backwards through 45° angle for hooking in the gap 32 defined in the casing of said video tape at one side. Once the cleaning pad 1 and the resilient fastener 2 are prepared, the cleaning pad 1 is attached to the resilient fastener 2 at an inner side at the front end thereof. As soon as the resilient fastener 2 is attached to a video tape, the cleaning pad 1 is disposed at a location facing to the magnetic tape 4 in said video tape.

Figure 4:
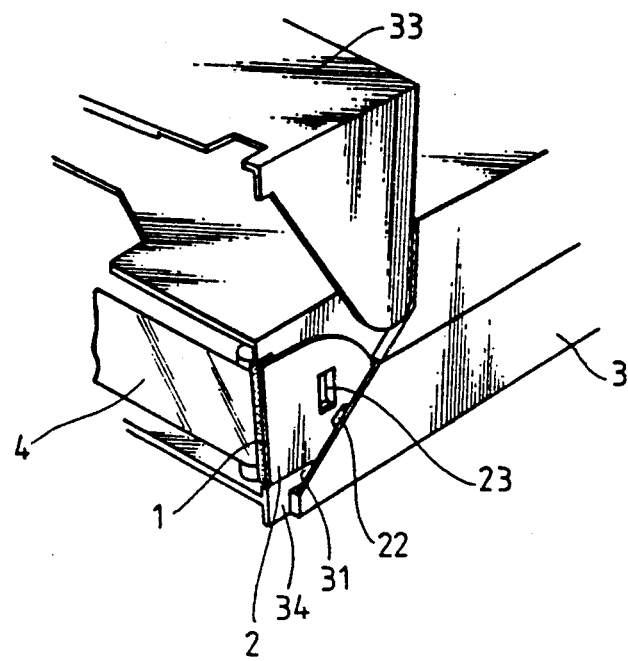
FIG. 4 is a perspective assembly view of the present invention.

Referring to FIG. 4 and seeing FIG. 3 again, the resilient fastener 2 is closely smoothly attached to the left side wall 34 of the casing 3 of a video tape by fastening the two hooked members 21 and 22 in the infrared projecting hole 31 in the casing 3 of said video tape and the gap 32 below said infrared projecting hole 31 between the protective cover 33 and the left side wall 34 of the casing 3 of said video tape, with the cleaning pad 1 disposed in the route of the magnetic tape 4 of said video tape and, with the rectangular hole 23 disposed in alignment with the infrared projecting hole 31 on the casing 3 of said video tape. Therefore, the magnetic tape 4 is simultaneously cleaned when it is played in a video tape player. Because the rectangular hole 23 is disposed in alignment with the infrared projecting hole 31 in the casing 3 of the video tape, infrared ray from a video tape player can be projected through the rectangular hole 23 and the infrared projecting hole 31 to detect the leader tape at either end of the magnetic tape 4 for winding and rewinding control. When the cleaning pad 1 is dirtied, the magnetic tape cleaner can be conveniently removed from the casing 31 of the video tape by pulling its front end (where the cleaning pad 1 is attached) outwards.

Figure 5:
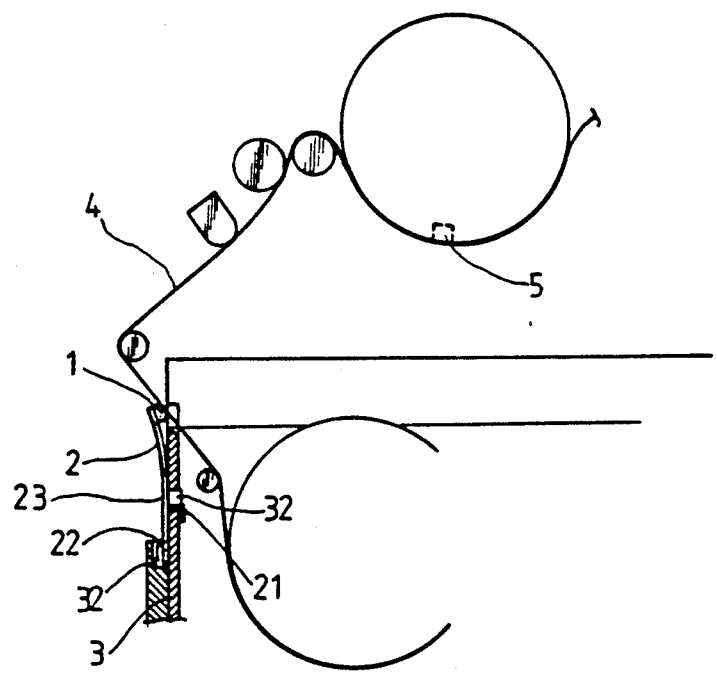
FIG. 5 illustrates the operation of the present invention in cleaning the running magnetic tape of a video tape during its playing mode.

Referring to FIG. 5, when a video tape which is attached with a magnetic tape cleaner of the present invention is loaded in a video tape player/recorder and the magnetic tape 4 thereof is carried to run over a magnetic head 5, the magnetic tape 4 is stretched outwards to rub over the cleaning pad 1 while running. When the magnetic tape 4 is stretched outwards from the casing 3 of the video tape during playing, a gap is maintained between the magnetic tape 4 and the casing 3 of the video tape to protect the magnetic tape 4 from rubbing against the casing 3 of the video tape during its running. After mounting, the cleaning pad 1 is disposed in the above-mentioned magnetic tape protective gap. Therefore, the installation of the present invention does not interfere with the playing of the video tape and its protective cover. Further, the bearing point of the magnetic tape cleaner on the casing 31 of the video tape, namely the hooked member 21 at the infrared projecting hole 31 is spaced from the cleaning pad 1 for a long distance, the cleaning pad 1 can be resiliently forced to move backwards by the magnetic tape 4 when the magnetic tape 4 is stretched during its playing mode. Therefore, friction force between the magnetic tape 4 and the cleaning pad 1 is greatly reduced while dirts on the magnetic tape is rubbed out by the cleaning pad 1. Because the magnetic tape 4 is cleaned by the cleaning pad 1 before touching the magnetic head 5, magnetic head contamination problem can be eliminated.

What is claimed is:

1. A magnetic tape cleaner, comprising a cleaning pad having a back-glued layer at the back, and a resilient fastening means attached to the casing of a video tape at the infrared light projecting hole thereon to hold said cleaning pad in the route through which the magnetic tape of said video tape passes during its playing mode, and characterized in that said resilient fastening means is made in a substantially rectangular shape comprising a first unitary hooked member near the center area thereof at one side, said first unitary hooked member having a hooked terminal end turning inwards backwards to hook in the infrared projecting hole on a video tape directly, a rectangular hole disposed in alignment with said infrared projection hole, and a second unitary hooked member disposed at the same side and spaced from said first unitary hooked member, said second unitary hooked member having a hooked terminal end turning outwards backwards through 45° angle to hook in the gap defined in the casing of said video tape at the left side between the protective cover thereof.

* * * * *